Dec. 10, 1968 L. A. KIEFER ET AL 3,415,274
CONTROL APPARATUS FOR FLUID DISTRIBUTION SYSTEM
Filed Nov. 23, 1966 2 Sheets-Sheet 1

INVENTORS
KENNETH E. LEHRKE,
BY   LEO A. KIEFER

Frederick E. Junge
ATTORNEY

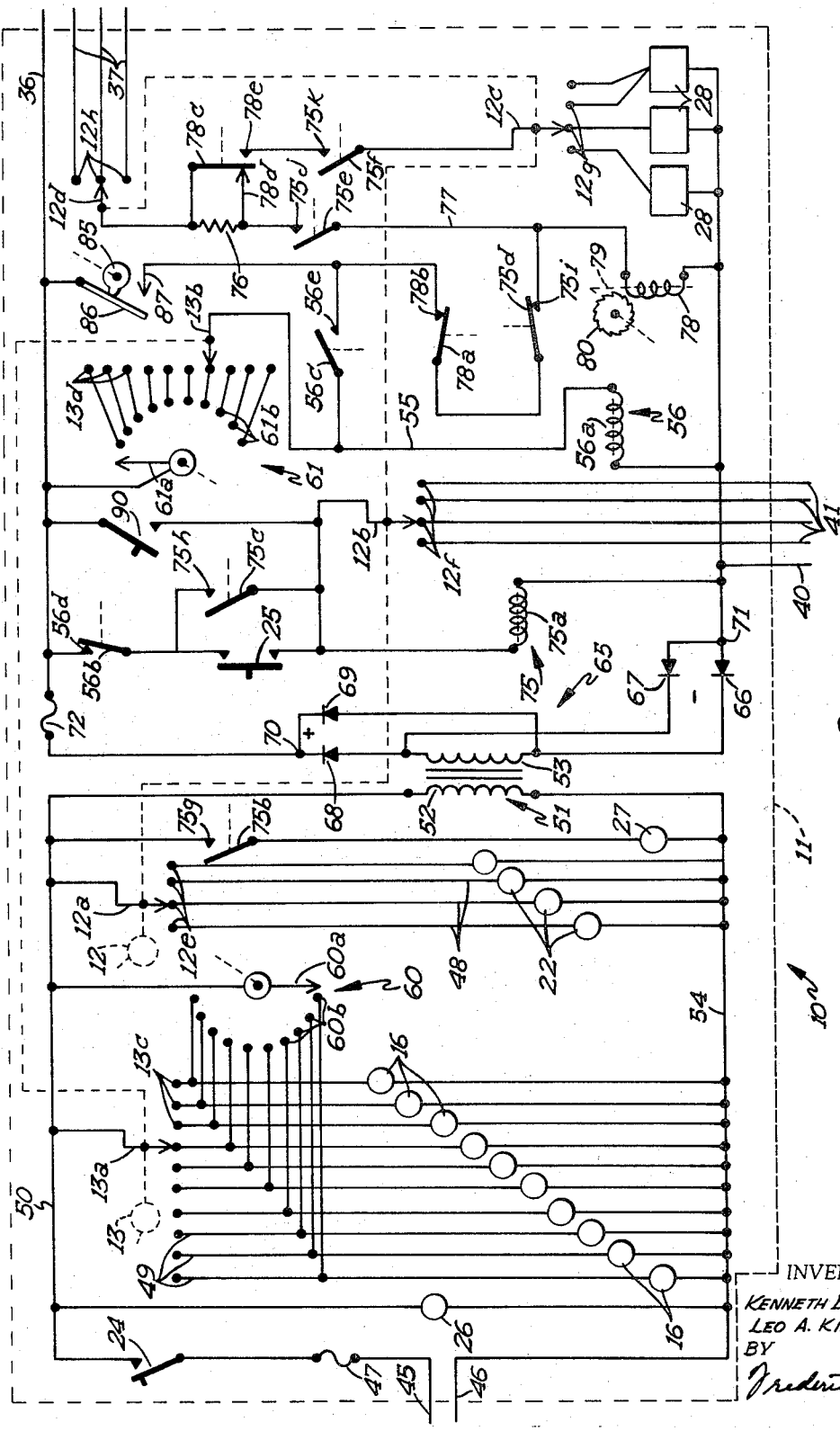

United States Patent Office

3,415,274
Patented Dec. 10, 1968

3,415,274
CONTROL APPARATUS FOR FLUID
DISTRIBUTION SYSTEM
Leo A. Kiefer, New Hope, and Kenneth E. Lehrke, Minneapolis, Minn., assignors to Gray Company, Inc., Minneapolis, Minn., a corporation of Minnesota
Filed Nov. 23, 1966, Ser. No. 596,679
8 Claims. (Cl. 137—551)

ABSTRACT OF THE DISCLOSURE

A fluid dispensing system in which a preselected quantity of fluid is delivered to one of a plurality of separate remote locations under the control of a control device adapted to be centrally located and having one selector knob for selecting the location to which fluid is to be dispensed and a second selector knob for selecting the quantity of fluid to be delivered to that location. A plurality of indicating lights are associated with each of the selector knobs, and as the location selector knob is adjusted a light corresponding to the selected location is energized. As the quantity selector knob is adjusted, a quantity indicating light representing the selected quantity is energized. After selection of the location and quantity, a starting button on the control device is depressed to open an electrically operated valve and initiate delivery of fluid to the selected location. As the fluid is dispensed, the quantity indicating lights are sequentially energized in response to the quantity of fluid which has been delivered to the selected location. After delivery of the preselected quantity, the control device causes the closing of the valve connected to the conduit through which the fluid is being delivered, thereby terminating delivery.

---

Figure 1:
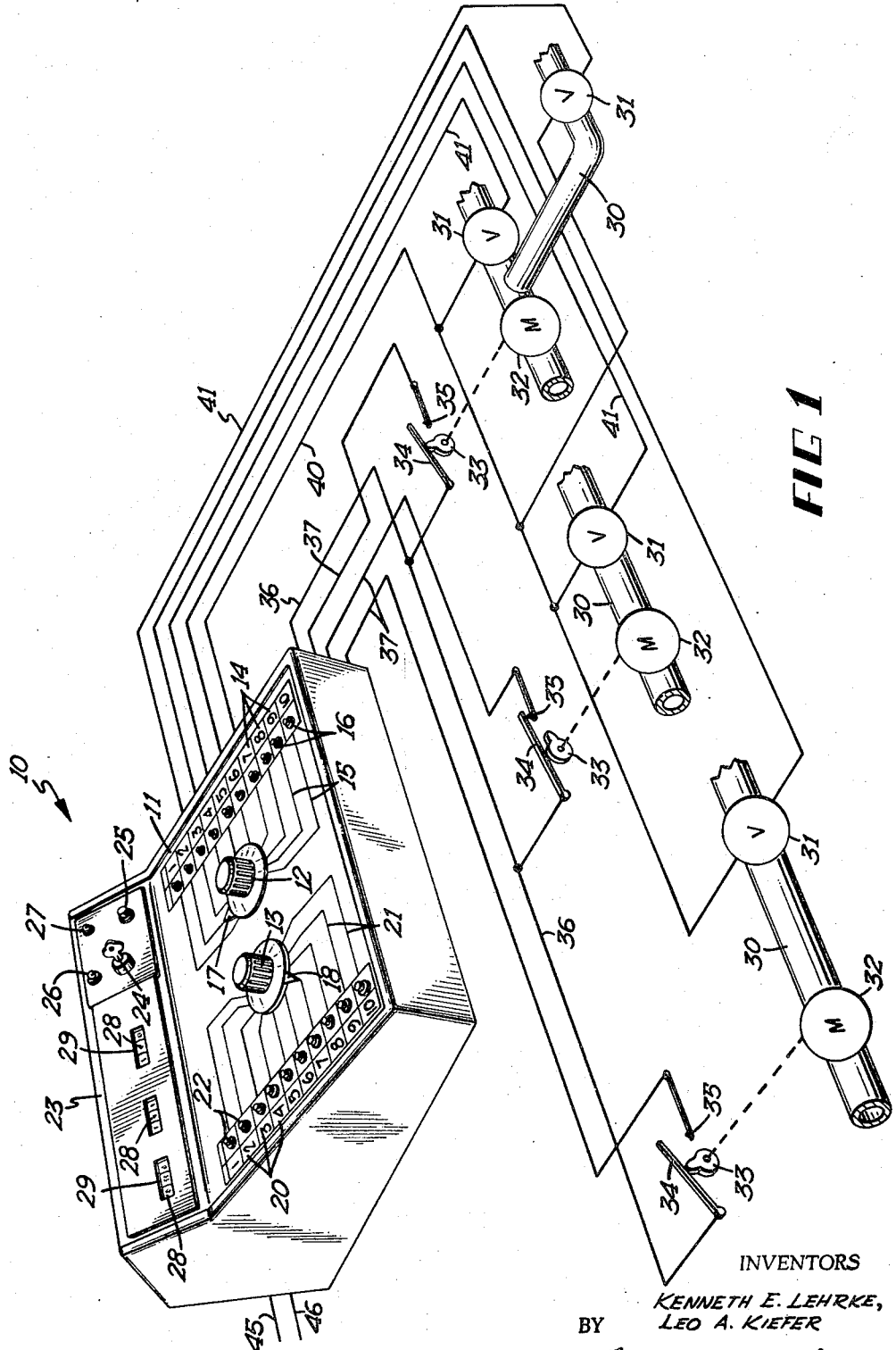

It has previously been proposed to centrally control the delivery of fluid to a plurality of remote locations by providing a multiplicity of fluid conduits to these locations, each having a fluid meter and electrically actuable valve associated therewith. It has also previously been proposed to centrally select the location to which fluid is to be delivered, and to preselect the quantity to be delivered to that location, with delivery then being automatically terminated upon delivery of the preselected amount.

In such previous fluid control systems, however, the initiation of delivery to a particular location has been controlled by means located at the delivery location, but more importantly, these previous systems have embodied relatively bulky mechanical components, with the result that the control devices have been relatively costly to manufacture and have been relatively large in size. The present invention, on the other hand, embodies electrical controls which provide a device having a minimum number of mechanical parts, and one which is consequently substantially more compact. The present invention further provides readily observable lights for indicating the location to which fluid is delivered, the quantity of fluid which is to be delivered to that location, and, during delivery, the amount of fluid which has been delivered to the selected location. The invention thus provides location selection and indication, quantity selection and indication, and automatic termination after delivery of the preselected quantity, by means of a single control device which utilizes a minimum number of mechanical parts. The present invention is less bulky, less complex, and more economical to manufacture than previous fluid control devices. It is sufficiently compact and lightweight to be supported on a desk or table, and it may be mounted in even a relatively restricted space. There is provided in one central location a single compact control box adapted to fully control the delivery of fluid to a plurality of remote locations and to fully indicate the delivery being made.

It is therefore an object of the present invention to provide a relatively compact centrally located fluid delivery control device for fully controlling the delivery of a preselected quantity of fluid to one of a plurality of remote locations.

Another object of the invention is to provide a fluid dispensing control device having a plurality of location indicating lights for indicating the location to which fluid is to be delivered, and a plurality of quantity indicating lights to indicate the preselected quantity to be delivered and also to indicate the quantity which has been delivered as delivery is being made.

A further object of the invention is to provide a fluid dispensing control device in which a location selector is adjusted to selectively connect a source of electrical power to one of a plurality of location indicating lights, to an electrically actuable valve associated with a fluid conduit adapted to deliver fluid to the preselected location, to fluid meter contacts associated with the conduit, and to means for indicating the total quantity of fluid delivered to the location.

Other objects of the invention may become apparent from a consideration of the accompanying specification and claims, and from the drawing in which:

FIGURE 1 is a perspective view of the fluid delivery control device shown connected to a schematically represented fluid dispensing system; and FIGURE 2 is a schematic diagram of the interior of the fluid delivery control device illustrated in FIGURE 1.

Referring specifically to FIGURE 1, the fluid delivery control device comprises a control box indicated in its entirety by general reference numeral 10. The control box 10 has a generally upwardly facing front control panel 11 upon which are mounted a manually adjustable selector knob 12 for selecting the location to which fluid is to be delivered and a manually adjustable quantity selector knob 13 for selecting a predetermined quantity of fluid to be delivered to the selected location. A pointer 17 is secured to the location selector knob 12, and a pointer 18 is secured to the quantity selector knob 13.

The location selector knob 12 is rotatably adjustable to a plurality of positions corresponding to the plurality of separate locations to which fluid may be delivered. Ten positions representing ten such locations are illustrated in FIGURE 1, but, to simplify the drawing, the electrical connections for only four of the locations are shown in FIGURE 2. The separate locations are represented by a series of numbered boxes 14 inscribed on the face of the control panel 11. A plurality of lines 15 extends radially from the location selector knob 12, and each line is connected to one of the numbered boxes 14 which correspond to the delivery locations. A plurality of location indicating lights 16 is aligned on the control panel 11, with each indicating light 16 disposed in one of the numbered boxes 14 adjacent a corresponding number.

A similar plurality of numbered boxes 20 is disposed adjacent the quantity selector knob 13, with each of the boxes being connected to one of a plurality of lines 21 inscribed on the face of the control panel 11 and extending radially from the quantity selector knob 13. One of a plurality of quantity indicating lights 22 is disposed in each of the numbered boxes 20 adjacent a number representing a multiple quantity of fluid.

A rear panel 23 of the control box 10 supports a key operated power switch 24, a delivery starting switch 25, a power indicating light 26 which is energized when the control device is connected to a source of electrical power by the key switch 24, and a delivery indicating light 27 which is energized during delivery of fluid to any of the plurality of separate locations upon momentary closing of the delivery starting switch 25. A plurality of total quantity registers 28 is disposed in a plurality of horizontally aligned windows 29 formed in the rear panel 23 to indicate the total amount of fluid delivered to a given location by way of one or more separate deliveries.

A multiplicity of fluid conduits 30, portions of which are shown in FIGURE 1, extends from one or more sources of fluid, not shown, to a plurality of separate delivery locations. Each conduit 30 has associated therewith an electrically operated valve 31 and a fluid meter 32. Each fluid meter 32 is mechanically connected to a rotatable cam 33 which is adapted to intermittently engage a switch blade 34 with a cooperating contact 35 as fluid is delivered through the respective fluid conduit 30. As shown in FIGURE 1, the switch blades 34 are all connected to a common conductor 36, which extends into the control box 10. Each of the cooperating contacts 35 is connected to a separate one of a plurality of conductors 37, which also extend into the control box 10.

The electrically operated valves 31 associated with the fluid condits 30 are biased into a closed position and are opened only when a circuit is completed to them. The valves are all connected to a common conductor 40, and each is connected to a separate one of a plurality of conductors 41, all of which extend into the control box 10. When a circuit is completed through one of the plurality of conductors 41 and through the common conductor 40 to one of the valves 31, that valve is actuated to an open position to permit the flow of fluid through the conduit 30 to which the valve is connected. When this circuit is subsequently broken, the valve returns to its normal closed position to terminate delivery of fluid.

Referring now to FIGURE 2, conductors 45 and 46 extend from a source of A.C. power, not shown, into the interior of the control box 10. Conductor 45 is connected to a fuse 47, which is connected in series with the key operated power switch 24. The A.C. power source is connected to the primary winding 52 of a transformer 51 having a secondary winding 53. The primary winding 52 is connected through conductors 50 and 54 to conductors 45 and 46 in series with the power source and the key switch 24. The power indicating light 26 is connected in series with the A.C. source and switch 24, and is energized when switch 24 is closed to complete the connection between the power source and the primary winding 52 of transformer 51.

As schematically represented by dotted line in FIGURE 2, the location selector knob 12 is mechanically connected to a plurality of movable selector switch arms or sliders 12a, 12b, 12c and 12d. Each of the sliders 12a, 12b, 12c and 12d is adapted to cooperate with a separate plurality of fixed contacts 12e, 12f, 12g and 12h, respectively, with the number of contacts in each plurality corresponding to the number of delivery locations. As previously indicated, the electrical connections for only three delivery locations are shown in FIGURE 2, although delivery of fluid to a greater number of locations may be provided as illustrated by the ten numbered boxes 14 shown in FIGURE 1. Each of the plurality of fixed contacts 12e is connected by one of a plurality of conductors 48 to one of the plurality of location indicating lights 22, which are connected through conductor 54 to input conductor 46. The slider 12a is connected through conductor 50 and key operated switch 24 so that when the latter is closed an energizing circuit is established to one of the location indicating lights 22 depending upon which of the contacts 12e is engaged by the slider 12a.

The fixed contacts 12f which cooperate with slider 12b are each connected to one of the plurality of conductors 41 which are connected to valves 31. The slider 12b is operable to engage one of the contacts 12f and thereby selectively energize one of the electrically operated valves 31 to control delivery of fluid through the corresponding conduit 30. The fixed contacts 12g, which cooperate with slider 12c are each connected to one of the plurality of total quantity registers 28 for selectively registering the total quantity of fluid dispensed to a given location after one or more deliveries. The fixed contacts 12h which cooperate with the movable slider 12d are each connected to one of the plurality of conductors 37 which are connected to a corresponding fluid meter contact 35. Slider 12d is thus selectively connected to the particular fluid meter contact 35 associated with the conduit 30 through which fluid is being delivered.

The quantity selector knob 13 is schematically shown in dotted line in FIGURE 2 as being mechanically connected to a pair of movable sliders 13a and 13b, which each cooperate with a separate plurality of fixed contacts 13c and 13d, respectively. The contacts 13c are each connected to one of the quantity indicating lights 16, and the slider 13a is connected to conductor 50. Thus, when the key switch 24 is closed and slider 13a is connected to one of the fixed contacts 13c, the corresponding quantity indicating light 16 is energized. The slider 13b is connected by a conductor 55 to control energization of a relay designated in its entirety by general reference numeral 56. Relay 56 comprises a relay coil 56a and two switch blades 56b and 56c, which cooperate with contacts 56d and 56e, respectively. Switch blade 56b is biased into engagement with contact 56d, and switch blade 56c is biased out of engagement with contact 56e.

A stepping switch, indicated in its entirety by general reference numeral 60, is adapted to sequentially energize the quantity indicating lights 16 as fluid is delivered to any one of the several locations. Stepping switch 60 comprises a movable switch arm 60a which is connected to conductor 50, and a plurality of radially aligned fixed contacts 60b, each of which is connected to one of a plurality of conductors 49. As will be explained, the movable stepping switch arm 60a is intermittently rotated in a clockwise direction to sequentially engage the plurality of contacts 60b and thereby energize the corresponding quantity indicating lights 16.

A second stepping switch, indicated in its entirety by general reference numeral 61, is adapted to control the energization of coil 56a of relay 56. Stepping switch 61 comprises a movable switch arm 61a, which is connected to the conductor 36, and a plurality of radially aligned fixed contacts 61b each of which is connected to a respectively selector switch contact 13d. As will be ex-explained, the stepping switch arm 61a is intermittently rotated in a clockwise direction to sequentially engage the plurality of radially aligned contacts 61b. When the arm 61a engages the contact 61b connected to the contact 13d with which slider 13b is engaged, relay 56 is energized.

The secondary winding 53 of the transformer 52 is connected to a rectifier bridge indicated in its entirety by general reference numeral 65. The rectifier bridge 65 comprises rectifiers 66, 67, 68 and 69, connected to act as a full wave rectifier forming a D.C. power source having a postive terminal indicated at 70 and a negative terminal indicated at 71. The rectifier bridge 65 is connected in series with a fuse 72 and the delivery starting switch 25, with the bridge, fuse and starting switch all being in series with a multiple contact relay 75. The relay 75 comprises a coil 75a and a plurality of switch blades 75b, 75c, 75d 75e and 75f which cooperates with a plurality of contacts 75g, 75h, 75i, 75j and 75k, respectively. Switch blade 75d is biased into engagement with contact 75i, and all of the other switch blades of relay 75 are biased out of engagement with their respective contacts, moving into engagement therewith only upon energization of relay coil 75a.

The slider 12d, which cooperates with the plurality of contacts 12h connected to the fluid meter contacts 35, is connected through a resistance 76 to contact 75j, and switch blade 75e is connected by a conductor 77 to a stepping switch coil 78. The stepping switch coil 78 actuates a movable armature 79, which is designed to engage a notched wheel 80 as the armature reciprocates upon intermittent energization of the coil as it receives electrical pulses upon the closing of the fluid meter contacts. The wheel 80 is mechanically connected to rotate the stepping switch arms 60a and 61a of stepping switches 60 and 61 into sequential engagement with their respective pluralities of fixed contacts 60b and 61b. The stepping switch coil 78 also serves as a relay coil to actuate a switch blade 78a which cooperates with a contact 78b, and to actuate a switch blade 78c which cooperates with a pair of contacts 78d and 78e.

Switch blade 75b and contact 75g of relay 75 are connected in series with the delivery indicating light 27 and the A.C. power source to energize the light when relay 75 is energized and delivery is initiated. Switch blade 75c and contact 75h are connected in parallel with delivery starting switch 25 to serve as a holding contact for maintaining energization of relay 75 when starting switch 25 is released after being momentarily closed. Switch blade 75e and contact 75j are connected in series with slider 12d, the resistance 76 and the stepping switch coil 78 to control the intermittent energization of the stepping switch coil 78 through the fluid meter contacts 34 and 35. Switch blade 75f and contact 75k are connected in series with the slider 12c and the total quantity registers 28 to control the periodic actuation of the registers by the fluid meter pulses.

A rotatable cam 5 is mechanically connected to the rotatable arm 61a of stepping switch 61, and the cam turns through a corresponding angle as arm 61a is rotated. The cam 85 is disposed adjacent a switch blade 86 which is biased into engagement with a contact 87 which is connected to contacts 56e and 78b. The cam 85 serves to move switch blade 86 out of engagement with contact 87 when stepping switch arm 61a is in the position shown in FIGURE 2. When arm 61a is rotated by energization of the stepping switch coil 78 to the first contact 61b, the cam 85 is rotated out of engagement with the switch blade 86, which then returns to its normal position of engagement with contact 87 until the stepping switch arm 61a and cam 85 pass through a full clockwise rotation back to the position shown in FIGURE 2.

While the electrically operated valves 31 are normally energized only upon closure of delivery starting switch 25 and the subsequent engagement of switch blade 75c with the contact 75h as a result of energization of relay coil 75a, they may be energized independently of starting switch 25 by closing a manually operated switch 90 which is connected to slider 12b in series with the rectifier bridge 65. After selection of a delivery location, the operator may want to terminate delivery at will rather than deliver a preselected quantity of fluid to the location. For example, it might be desirable to independently control the quantity delivered where a container of unknown capacity is to be filled. When the manually operated switch 90 is closed, a circuit to the selected valve 31 is established which is independent of the delivery termination control. Switch 90 controls delivery independently of the starting switch 25, and multiple contact relay 75 is actuated independently of the position of switch blade 56b with regard to contact 56d. When switch 90 is closed, switch blades 75e and 75f are moved into engagement with their respective contacts 75j and 75k to enable the stepping switch coil 78 and the total quantity registers 28 to receive electrical pulses through the fluid meter contacts. Operation of the stepping switches and the appropriate total quantity register is thus as previously described, except that energization of relay coil 56a does not terminate delivery, since an electrical circuit is maintained to the valve 31 through manual switch 90 even after switch blade 56b moves out of engagement with contact 56d.

Operation

The key operated power switch 24 is closed to connect the control device to the source of A.C. power, and this connection is indicated by energization of light 26. The location selector knob 12, shown in FIGURE 1, is then adjusted to rotate the pointer 17 into registration with the line 15 extending to the box 16 which represents the location to which fluid is to be delivered. As shown in FIGURE 2, adjustment of the location selector knob 12 engages the slider 12a with a contact 12e to energize a location indicating light 22 corresponding to the location to which fluid is to be delivered. Adjustment of the selector knob 12 also engages slider 12b with the contact 12f which is connected to the valve 31 through which fluid is to be delivered. Slider 12c is likewise engaged with the contact 12g which is connected to the total quantity register 28 corresponding to the location to which fluid is to be delivered. Selector knob 12 also engages slider 12d with the contact 12h which is connected to the fluid meter contact 35 associated with the meter 32 through which fluid is to be delivered.

After selector knob 12 has been adjusted to select the desired location, the quantity selector knob 13, shown in FIGURE 1, is adjusted to rotate the pointer 18 into registration with the line 21 extending to the box 20 which represents the quantity to be delivered to the selected location. Referring to FIGURE 2, adjustment of quantity selector knob 13 engages slider 13a with the cooperating contact 13c connected to the quantity indicating light 16 representing the selected quantity, thereby energizing the light 16. Adjustment of the quantity selector knob 13 also engages the slider 13b with the contact 13d corresponding to the quantity to be delivered.

After selector knobs 12 and 13 are adjusted and the lights 22 and 16 representing the selected location and quantity are energized, the starting switch 25 is momentarily closed. Referring to FIGURE 2, the closing of switch 25 completes a circuit from the positive terminal 70 of the rectifier bridge 65 through fuse 72, switch blade 56b, starting switch 25, slider 12b and the conductor 41 to which it is connected, the selected valve 31, and conductor 40 back to rectifier bridge 65, to open the valve and initiate delivery. A circuit is also established through the relay coil 75a and back to the negative terminal 71 of rectifier bridge 65 to energize relay 75. Upon energization of relay 75, switch blade 75b engages contact 75g to energize the delivery indicating light 27, and switch blade 75c engages contact 75h to maintain the circuit through relay coil 75a even after the starting switch 25 is opened. Energization of relay coil 75a further serves to move switch blade 75d out of engagement with contact 75i to prevent operation of a resetting arrangement for the stepping switches, to be described later. Energization of relay coil 75a also moves switch blades 75e and 75f into engagement with contacts 75j and 75k, respectively to permit energization of the stepping switch coil 78 from the fluid meter contacts and to make possible the operation of the total registers 28. The energization of relay 75 thus completes a circuit from the positive terminal 70 of rectifier bridge 65 through fuse 72, switch blade 56b, switch blade 75c, selector switch arm 12b, and the conductor 41 which is connected to the valve 31 of the conduit through which fluid is to be delivered, thereby maintaining the circuit to the valve to hold it in its open position. As fluid passes through the conduit 30 to the selected location, fluid meter 32 serves to intermittently open and close the fluid meter contacts 34 and 35 to produce a pulse of current from the rectifier bridge 65 through conductors 36 and 37, slider 12d, switch blade 78c, and switch blade 75e, to momentarily energize stepping switch coil 78. Energization of stepping switch coil 78 actuates the armature 79, which engages the notched wheel 80 to rotate the stepping switch arms 60a and 61a in a clockwise direction into engagement with the first of the radially aligned fixed contacts 60b and 61b, respectively. Engagement of the stepping switch arm 60a with a contact 60b energizes the quantity indicating light 16 to which that contact is connected. Engagement of the stepping switch arm 61a with a contact 61b has no effect until the arm 61a is connected to the contact 61b to which slider 13b is connected. Rotation of stepping switch arm 61a also rotates the cam 85 to which it is connected, thereby engaging switch blade 86 with contact 87. Engagement of switch blade 86 with contact 87 produces no electrical effect, however, since switch blade 56c is out of engagement with contact 56e, and since switch blade 75d is out of engagement with contact 75i. Energization of stepping switch coil 78 also moves switch blade 78a out of engagement with contact 78b, but this likewise produces no electrical effect since switch blade 75d is out of engagement with contact 75i. Energization of stepping switch coil 78 also actuates switch blade 78c to move it out of engagement with contact 78d and into engagement with contact 78e, thereby delivering a pulse of current through switch blade 75f and slider 12c to the total quantity register 28 corresponding to the selected location. Energization of the total quantity registers 28 sequentially advances the numerical dials in a well known manner to record the total quantity of fluid which has been delivered to the particular location.

Referring to FIGURE 1, as fluid continues to pass through the meter 32, the corresponding cam 33 is rotated to move switch blade 34 out of engagement with contact 35 and thereby break the circuit to stepping switch coil 78. The cam 33 continues to rotate and when a unit of fluid has been dispensed, switch blade 34 is again engaged with contact 35 to produce another electrical pulse through the coil 78, to thereby advance the stepping switch arms 60a and 61a to the next adjacent contacts 60b and 61b, respectively. Likewise, another pulse is delivered to the total quantity registers 28 to sequentially advance the registers in proportion to the additional quantity of fluid delivered to the selected location. This production of electrical pulses by the fluid meter contacts is repeated as fluid passes through the meter 32, thereby sequentially energizing the quantity indicating lights 16 to indicate the amount of fluid which has been delivered. The stepping switch arm 61a is sequentially engaged with the contacts 61b until it engages the contact connected to the contact 13d in engagement with the slider 13b.

When the selected quantity has been delivered, the stepping switch arm 61a engages the contact with which slider 13b is engaged and a circuit is completed from the positive terminal 70 of the rectifier bridge 65 through fuse 72, conductor 36, stepping switch arm 61a, the selected contact 13d, slider 13b, conductor 55 to relay coil 56a of relay 56 and back to the negative terminal of rectifier bridge 65. When relay coil 56 is energized, switch blade 56b moves out of engagement with contact 56d to terminate energization of relay coil 75a and break the circuit to the valve 31 through which fluid is being delivered, thereby terminating delivery. Upon de-energization of relay coil 75a, switch blade 75b moves out of engagement with contact 75g to de-energize delivery indicating light 27, and switch blades 75e and 75f move out of engagement with contacts 75j and 75k, respectively, to break the circuits from the fluid meter contacts to the stepping switch coil 78 and to the total quantity registers 28. De-energization of relay coil 75a further serves to engage switch blade 75d with contact 75i to complete a circuit from the positive terminal 70 of rectifier bridge 65 through fuse 72, conductor 36, switch blade 86, switch blade 78a, stepping switch coil 78 and back to the negative terminal of rectifier bridge 65. Stepping switch coil 78 is thus energized to continue the intermittent clockwise rotation of stepping switch arms 60a and 61a. Energization of stepping switch coil 78 moves switch blade 78a out of engagement with contact 78b to break the circuit to stepping switch coil 78, and when the coil is de-energized, switch blade 78a returns to its position of engagement with contact 78b and the coil 78 is again energized. This process of intermittent energization of stepping switch coil 78 is thus repeated even though fluid is not being delivered, and the stepping switch arms 60a and 61a are rotated in a clockwise direction until they return to the positions shown in FIGURE 2. As the stepping switch 61 is rotated, the connected cam 85 is rotated through a corresponding angle, and when the stepping switch arm 61a returns to the position shown in FIGURE 2, the cam 85 moves the switch blade 86 out of engagement with contact 87 to break the circuit to stepping switch coil 78. With the stepping switches 60 and 61 thus returned to their initial positions, the control device is again prepared for another delivery cycle.

As shown in FIGURE 1, more than one fluid conduit 30 and its corresponding valve 31 may be associated with a single meter 32. For example, a single meter 32 may be utilized in delivery from one source to a large number of separate locations, with delivery to each location being independently controlled by a separate valve 31 connected to each of the conduits 30. By way of illustration, the fluid delivery system shown in FIGURE 1 could be connected to draw fluid from three sources and deliver it to four separate locations. As will readily be understood, additional conduits and valves could be connected to the three meters illustrated in FIGURE 1 to control the delivery of fluid from three sources to a greater number of separate locations.

As herein described, the invention thus provides a compack, lightweight control device for selecting one of a plurality of locations to which fluid is to be delivered, and for preselecting a quantity of fluid to be delivered to the selected location, with automatic termination after the preselected amount has been delivered. A plurality of lights on the control panel indicates when the device is connected to the electrical power, the location to which fluid is to be delivered, the quantity of fluid to be delivered to the location, when delivery is being made and the quantity which has been delivered at any time. The device, which may be conveniently located on a desk or table at at central location, is thus adapted to fully indicate and control the delivery of fluid to a plurality of remote locations.

It will be understood that the control device herein described is intended as an illustrative example of the present invention and that the invention is not limited to this embodiment. It will be apparent that the device may be constructed with a greater or lesser number of selectable locations and quantities, as well as the indicating means associated therewith. It is to be understood, therefore, that the invention is to be limited only by the appended claims.

We claim as our invention:

1. In a fluid delivery system having a plurality of conduits each connected to deliver fluid to a different one of a plurality of separate locations, delivery control means associated with each of said conduits and measuring means responsive to the amount of fluid delivered through each of said conduits and producing electrical pulses in proportion thereto, a control box for selecting the one of said locations to which fluid is to be delivered and the quantity of fluid to be delivered to said location and for visually indicating at all times the quantity of fluid which has been selected and the quantity delivered, said control box comprising a panel having a plurality of manual selectors thereon, one for selecting the location to which fluid is to be delivered and one for selecting the quantity of fluid to be delivered to said location, a plurality of separate multiple contact selector switch means associated with each of said manual selectors, a plurality of quantity indicating lights on said control panel adjacent said quantity manual selector and representing multiple quantities of fluid, electrical connections between the selector switch means associated with said quantity manual selector and said quantity indicating lights for selectively energizing one of said quantity indicating lights in accordance with the quantity selected, electrical connections between the selector switch means associated with said location manual selector and said delivery control means for selective energization of one of said control means to initiate delivery to the selected location, stepping switch means in said control box and means for operating said stepping switch means in accordance with the electrical pulses produced by said measuring means, electrical connections between said stepping switch means and said quantity indicating lights for indicating the quantity of fluid which has been delivered at any time, and means controlled by said stepping switch means for terminating delivery of fluid to said location when the preselected amount of fluid has been delivered.

2. The apparatus of claim 1 in which said control box has a single manually operable switch which, when momentarily engaged, initiates the delivery operation regardless of which location has been selected.

3. The apparatus of claim 1 in which said control box has a plurality of total quantity registers for registering the total quantity of fluid delivered to one or more of said locations after one or more deliveries thereto.

4. The apparatus of claim 1 in which said control panel has a delivery indicating light which is energized upon initiation of delivery to any of said locations, and which is de-energized upon termination of said delivery.

5. The apparatus of claim 1 in which a manually operable switch is adapted to actuate said delivery control means independently of said quantity manual selector and said delivery terminating means.

6. The apparatus of claim 1 in which said plurality of quantity indicating lights simutaneously indicates both the selected quantity of fluid which is to be delivered and also the portion of said quantity which has been delivered after delivery has been commenced.

7. The apparatus of claim 1 in which a plurality of location indicating lights is disposed on said control panel adjacent said location manual selector for indicating the location to which fluid is to be delivered, and in which electrical connections are provided between said lights and the switch means associated with said location manual selector for selectively energizing one of said location indicating lights in accordance with the location selected.

8. The apparatus of claim 1 in which at least one of said measuring means is associated with a plurality of said conduits and the plurality of delivery control means connected thereto, said measuring means being responsive to delivery of fluid through any one of said plurality of conduits.

References Cited
UNITED STATES PATENTS

| | | | |
|---|---|---|---|
| 3,144,046 | 8/1964 | Seeselberg | 137—551 |
| 2,538,243 | 1/1951 | Hazard et al. | 222—15 |
| 2,540,618 | 2/1951 | Hazard | 225—15 |

HENRY T. KLINKSIEK, *Primary Examiner.*

U.S. Cl. X.R.

137—609; 73—195; 340—239